US006269724B1

(12) United States Patent
Sabatelli et al.

(10) Patent No.: US 6,269,724 B1
(45) Date of Patent: *Aug. 7, 2001

(54) METHOD AND APPARATUS FOR PRODUCING A CONTINUOUS WEB FROM A BLOCK OF MATERIAL

(75) Inventors: David Albert Sabatelli, Cleves; Charles Zell Smith, III, Loveland, both of OH (US); Robert John Steller, Ft. Thomas, KY (US); Eric Richard Wilhelm, Harrison, OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,172

(22) Filed: Sep. 29, 1997

(51) Int. Cl.[7] .......................... B26D 1/46; B27B 13/00; B23C 1/14

(52) U.S. Cl. .......................... 83/813; 83/661; 83/788; 409/165; 29/33 S

(58) Field of Search .......................... 83/648, 649, 788, 83/794, 801, 813, 703, 730, 875, 826, 827, 862, 865, 404, 871, 809, 661; 409/165; 29/564, 33 Q, 335

(56) References Cited

U.S. PATENT DOCUMENTS

| | | | | |
|---|---|---|---|---|
| 385,201 | * | 6/1888 | Remus | 83/875 |
| 628,507 | * | 7/1899 | Williams | 83/404 |
| 666,275 | * | 1/1901 | Keasey | 83/703 |
| 800,979 | | 10/1905 | Bryan et al. | 83/733 |
| 835,341 | * | 11/1906 | Winfree, Jr. | 409/165 |
| 1,746,744 | * | 2/1930 | Siegle | 83/34 |

(List continued on next page.)

FOREIGN PATENT DOCUMENTS

WO 93/19903 10/1993 (WO) .............................. B65D/7/20

*Primary Examiner*—Kenneth E. Peterson
*Assistant Examiner*—Stephen Choi
(74) *Attorney, Agent, or Firm*—Michael S. Kolodesh; Roddy M. Bullock; David M. Weirich

(57) ABSTRACT

An apparatus for forming a continuous web of material from a block of material is disclosed. The block is preferably a cylindrical block having a base and a generally vertical central axis extending generally orthogonally from the base. The apparatus comprises a rotatable platen such that the block may be rotatably supported, and a milling cutter for displacing portions of the block defining a displaced portion near the base of the block. A blade is positioned generally parallel to the central axis of the block, the blade positioned to cut into the block a predetermined distance from the central axis. The blade has a portion operatively disposed within the displaced portion of the block. The apparatus also comprises a drive mechanism for rotating the platen; as well as a linear drive mechanism for linearly decreasing the predetermined distance of the blade from the central axis. A central controller is included for controlling the blade and the platen in operative relationship such that the continuous web is produced as rotating platen is rotated while the predetermined distance of the blade from the central axis is continuously decreased. A method of forming a continuous web of material from a block of material having a base, and a generally vertical central axis extending generally orthogonally from the base is also disclosed. The method comprises the steps of providing a block supported at its base upon a rotatable platen displacing a portion of the block near the base. The method also includes providing a cutting blade disposed generally parallel to the central axis; and preferably guiding the block into the cutting blade by linearly advancing the rotatable platen while the block is rotating upon the rotatable platen such that a continuous web is produced as the cutting blade cuts in a substantially spiral path through the cylindrical block.

8 Claims, 10 Drawing Sheets

U.S. PATENT DOCUMENTS

| | | | | |
|---|---|---|---|---|
| 2,670,768 | * | 3/1954 | Yohn | 83/870 |
| 2,692,624 | * | 10/1980 | Sorenson | 144/212 |
| 3,259,004 | * | 7/1966 | Chisholm | 83/788 |
| 3,263,537 | * | 8/1966 | Rehman et al. | 83/871 |
| 3,736,820 | * | 6/1973 | Jung | 83/730 |
| 3,850,061 | * | 11/1974 | Wirstrom | 83/871 |
| 3,888,150 | * | 6/1975 | Stroud | 83/404 |
| 3,889,564 | * | 6/1975 | Aspinwall et al. | 83/788 |
| 3,994,065 | | 11/1976 | Plum | 30/273 |
| 4,030,386 | | 6/1977 | Poetzsch et al. | 83/4 |
| 4,033,213 | * | 7/1977 | Eiselt et al. | 83/661 |
| 4,059,035 | | 11/1977 | Davis | 83/1 |
| 4,164,160 | | 8/1979 | Johansson et al. | 83/307.2 |
| 4,239,071 | * | 12/1980 | Ritchie | 144/365 |
| 4,466,170 | * | 8/1984 | Davis | 29/564 |
| 4,485,295 | | 11/1984 | Kellermeyer | 219/221 |
| 4,603,613 | * | 8/1986 | Wilson | 83/661 |
| 4,702,137 | * | 10/1987 | Davidson et al. | 83/730 |
| 4,791,970 | | 12/1988 | Walser et al. | 144/213 |
| 4,915,000 | | 4/1990 | MacFarlane | 83/651.1 |
| 5,009,138 | * | 4/1991 | Rettie | 83/413 |
| 5,178,193 | | 1/1993 | Sato et al. | 139/291 |
| 5,251,543 | | 10/1993 | Brothers | 99/538 |
| 5,281,119 | | 1/1994 | Iwano et al. | 425/72.1 |
| 5,299,483 | | 4/1994 | Ber-Fong | 83/870 |
| 5,360,042 | | 11/1994 | Teh | 144/365 |
| 5,381,841 | | 1/1995 | Weil | 144/209 B |
| 5,383,504 | | 1/1995 | Cremona | 144/215 |
| 5,385,184 | | 1/1995 | Mellor | 144/178 |
| 5,397,316 | | 3/1995 | LaVon et al. | 604/369 |
| 5,558,142 | * | 9/1996 | Ehrle et al. | 144/230 |
| 5,652,194 | | 7/1997 | Dyer et al. | 502/402 |

* cited by examiner

METHOD AND APPARATUS FOR PRODUCING A CONTINUOUS WEB FROM A BLOCK OF MATERIAL

FIELD OF THE INVENTION

This invention pertains to the production of continuous sheets or webs of materials. In particular, this invention relates to the production of continuous sheets or webs from a monolithic block of foam.

BACKGROUND OF THE INVENTION

The development of absorbent articles for use as disposable diapers, adult incontinence pads and briefs, and catamenial products such as sanitary napkins is the subject of substantial commercial interest. The ability to provide higher performance absorbent articles is primarily contingent on the ability to develop highly absorbent cores or structures that can acquire, distribute, and store large quantities of discharged body fluids, such as urine.

Open-celled polymeric foams are one example of absorbent materials capable of acquiring, distributing, and storing large quantities of discharged body fluids. Absorbent articles containing such foams can possess desirable wet integrity, can provide suitable fit throughout the entire period the article is worn, and can minimize changes in shape during use (e.g., uncontrolled swelling, bunching). In addition, absorbent articles containing such foam structures can be easier to manufacture on a commercial scale. For example, absorbent diaper cores can simply be stamped out from continuous foam sheets and can be designed to have considerably greater integrity and uniformity than absorbent fibrous webs. Such foams can also be prepared in any desired shape, or even formed into single-piece diapers.

Particularly suitable absorbent foams for high performance absorbent articles such as diapers have been made from High Internal Phase Emulsions (hereafter referred to as "HIPE"). See, for example, U.S. Pat. No. 5,260,345 (DesMarais et al), issued Nov. 9, 1993 and U.S. Pat. No. 5,268,224 (DesMarais et al), issued Dec. 7, 1993, hereby incorporated herein by reference. These absorbent HIPE foams provide desirable fluid handling properties, including: (a) relatively good wicking and fluid distribution characteristics to transport the imbibed urine or other body fluid away from the initial impingement zone and into other regions of the foam structure to allow for subsequent gushes of fluid to be accommodated; and (b) a relatively high storage capacity with a relatively high fluid capacity under load, i.e. under compressive forces.

When formed into sheets or webs, these HIPE absorbent foams are also sufficiently flexible and soft so as to provide a high degree of comfort to the wearer of the absorbent article; some can be made relatively thin until subsequently wetted by the absorbed body fluid. See also U.S. Pat. No. 5,147,345 (Young et al), issued Sep. 15, 1992 and U.S. Pat. No. 5,318,554 (Young et al), issued Jun. 7, 1994, which discloses absorbent cores having a fluid acquisition/distribution component that can be a hydrophilic, flexible, open-celled foam such as a melamine-formaldehyde foam (e.g., BASOTECT made by BASF), and a fluid storage/redistribution component that is a HIPE-based absorbent foam.

Currently, HIPE foam production is batch processed by curing (polymerizing) a high internal phase emulsion in large tubs or vats. Once cured, the resulting block of material is a water-filled, open-celled foam. By water-filled is meant that the porous structure is substantially filled with the residual water phase material used to prepare the HIPE. This residual water phase material (generally an aqueous solution of electrolyte, residual emulsifier, and polymerization initiator) is typically about 96–99% by weight of the cured HIPE foam. The cured foam block is preferably substantially cylindrical in shape, the shape being determined by the shape of the tub or vat, which is essentially a mold. In a typical batch process, the cured, water-filled foam block is generally cylindrical in shape, approximately 40–60 inches in diameter, approximately 24 inches high, and weighs from 500–2000 pounds.

For use in absorbent articles as part of an absorbent core, the block of water-filled foam is formed into relatively thin sheets and dewatered. The polymerized HIPE foam is typically cut or sliced to provide a sheet thickness in the range from about 0.08 to about 2.5 cm. It is preferable that the polymerized HIPE foam be cut or sliced into sheet form prior to dewatering since sheets of polymerized HIPE foam are easier to process during subsequent treating/washing and dewatering steps.

It is also preferable that continuous webs of dewatered foam material be formed and be converted to roll stock, suitable for subsequent processing into absorbent cores in a continuous process. However, current methods of cutting or slicing a block of cured foam do not permit cutting substantially continuous webs or sheets of material. Due to the size, weight, and structural integrity of the water-filled, porous block after curing, forming continuous webs of uniform thickness is not economically practical or technically feasible. For example, the weight and structural integrity of the foam block requires it to be fully supported during any subsequent processing, including cutting or slicing continuous webs or sheets. Such a configuration does not lend itself to being cut by known slicing or cutting techniques.

Continuous webs of uniform thickness may be produced by cutting about the circumference of a cylindrical block. If, however, the block must be fully supported upon its cylindrical base, these techniques are not feasible since they require a vertical cutting blade, the ends of which should be supported above and below the block. There is no space for a blade support below the block, however, due to the necessary supporting platen or platform. A reciprocating blade supported only at the upper end, e.g., a "saber" saw, may be used, but such a blade still needs clearance at least equal to the stroke length below the material being cut. Therefore, since the size and weight of the block limits the practicable options for producing continuous webs to those involving slicing or cutting around its circumference, the technically feasible processing of continuous webs of material by conventional methods such as veneering, or cutting by use of conventional saws is limited.

An additional problem faced when trying to cut continuous webs from a generally cylindrical block of water-filled HIPE material is subsequent web handling to form roll stock of webs. Water-filled HIPE foam webs are preferably dewatered prior to winding into roll stock. Dewatering of the continuous web may be accomplished in a number of ways, including squeezing between a series of dewatering nip rollers, suction by way of vacuum conveyors, or drying by radiant or convection heat. In general, however, such web processing requires that the web be moving at a constant rate to provide reliable and repeatable drying results. Therefore, cutting or slicing a continuous web of water-filled HIPE foam from the perimeter of a cylindrical block is preferably accomplished as the block is rotating at a constant tangential velocity rather than a constant angular velocity.

Accordingly, it would be desirable to be able to form continuous webs of material from a monolithic block of material.

Additionally, it would be desirable to be able to form continuous webs of material from a monolithic block supported upon a platen or platform.

Additionally, it would be desirable to be able to form a continuous web of water-filled HIPE foam material from a cured block of foam material.

Further, it would be desirable to be able to form continuous webs of foam material in an automated process such that webs of uniform thickness are produced at a uniform linear velocity.

SUMMARY OF THE INVENTION

The present invention comprises an apparatus for forming a continuous web of material from a block of material. The block is preferably a cylindrical block having a base and a generally vertical central axis extending generally orthogonally from the base. The apparatus comprises a rotatable platen such that the block may be rotatably supported, and means for displacing portions of the block defining a displaced portion near the base of the block. A blade is positioned generally parallel to the central axis of the block, the blade positioned to cut into the block a predetermined distance from the central axis. The blade has a portion operatively disposed within the displaced portion of the block. The apparatus also comprises rotational means for rotating the platen; as well as advancement means for linearly decreasing the predetermined distance of the blade from the central axis. Control means is included for controlling the blade and the platen in operative relationship such that the continuous web is produced as rotating platen is rotated while the predetermined distance of the blade from the central axis is continuously decreased.

A method of forming a continuous web of material from a block of material having a base, and a generally vertical central axis extending generally orthogonally from the base is also disclosed. The method comprises the steps of providing a block supported at its base upon a rotatable platen displacing a portion of the block near the base. The method also includes providing a cutting blade disposed generally parallel to the central axis; and guiding the block into the cutting blade by linearly advancing the rotatable platen while the block is rotating upon the rotatable platen such that a continuous web is produced as the cutting blade cuts in a substantially spiral path through the cylindrical block.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
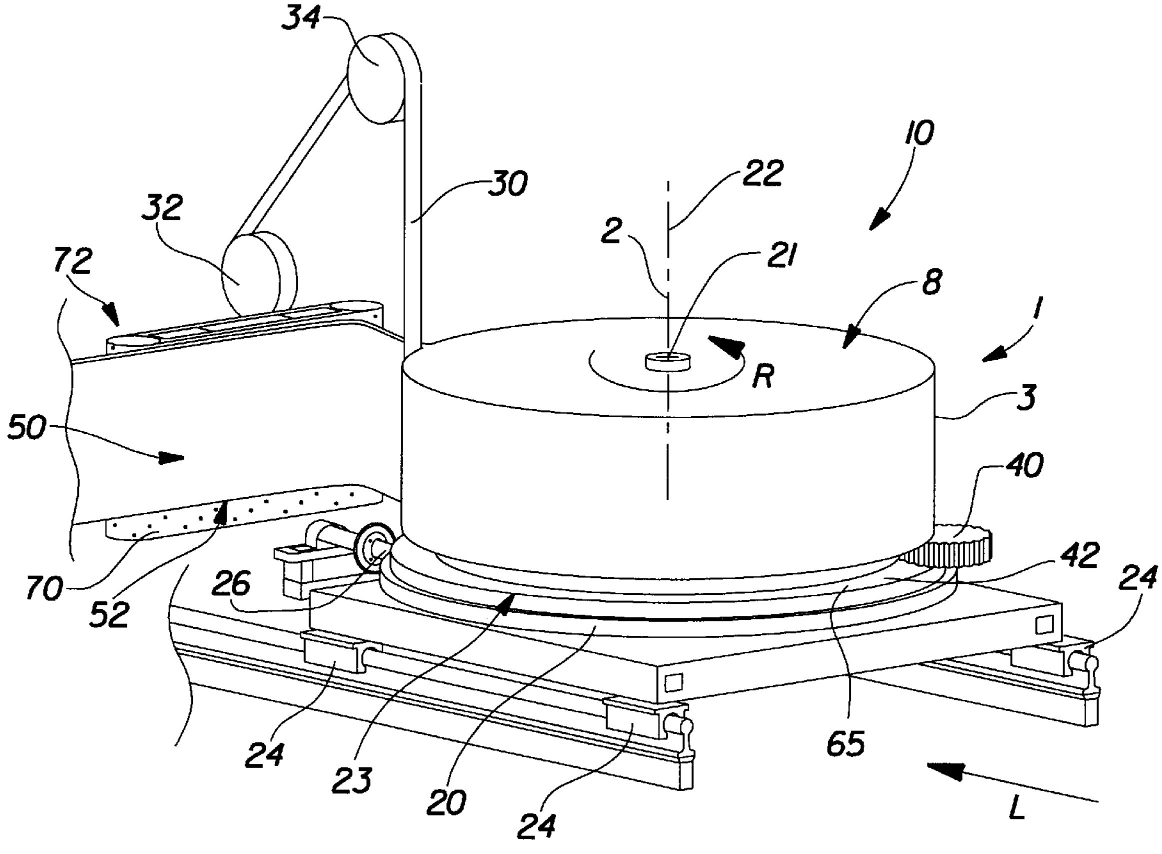
FIG. 1 is a perspective view of an apparatus of the present invention, with the central controller not shown for clarity.

While the following disclosure describes the method and apparatus of the present invention primarily in relation to the cutting of webs of polymeric foam materials, it is to be understood that the neither the method nor the apparatus of the present invention is limited to the processing of such materials. The method and apparatus of the present invention may be useful for the processing of any material that may be blade cut and which has sufficient structural integrity to be processed as a web or sheet such as non-foamed polymers, wood, or cheese.

As used herein, the term "block" refers to the material to be cut, prior to being cut. In general, in the context of the present invention, the term "block" refers to any three-dimensional, monolithic material suitable for cutting or slicing by a blade. The block need not be any particular shape to begin with, but it will be understood from the description that follows that a block having a cylindrical cross section is preferred. A block in the shape of a right circular cylinder is most preferred so as to minimize scrap and maximize the length of the cut web. In the context of the preferred embodiment of the present invention, as described below, the term "block" is used to refer to the solid foam HIPE structure formed as a result of curing a high internal phase emulsion in a batch process, sometimes referred to as a "bun". Such blocks may be made according to the process taught in commonly-assigned U.S. Pat. No. 5,650,222, issued to DesMarais on Jul. 22, 1997, the disclosure of which is hereby incorporated herein by reference.

In general, cutting continuous webs having uniform thickness by the method of the present invention requires a block in the form of a cylinder of generally circular cross section. The starting block, however, may be non-circular in cross-section, with the initial "rounding off" of the block producing non-continuous portions of material, possibly scrap to be recycled or discarded. When made according to the aforementioned DesMarais '222 patent in generally circular molds, the blocks are formed in generally cylindrical configurations, resulting in minimal scrap generation.

When cutting a block of HIPE foam, the method of the present invention produces a substantially continuous web of polymeric foam material from a water-filled block of cured foam. By "water-filled" is meant that the porous structure is substantially filled with the residual water phase material used to prepare the HIPE. This residual water phase material (generally an aqueous solution of electrolyte, residual emulsifier, and polymerization initiator) is typically about 96–99% by weight of the cured HIPE foam.

Being water-filled makes the block of HIPE foam relatively heavy, with a density near that of water, with relatively little structural material strength. Dewatering the foam block prior to cutting into webs or sheets would make the block easier to handle, but block dewatering is very time consuming and impracticable on a commercial scale. Continuous webs or sheets are therefore cut from the water-filled block of polymer foam and further processed to remove residual water. The weight and structural integrity of the water-filled block necessitates adequate support during the cutting operation. Practically, for water-filled HIPE foams, adequate support requires that the block be substantially completely supported from underneath, as described below with reference to FIGS. 1 and 3, with is the weight of the block evenly distributed across its base.

The continuous web may be dewatered and wound as roll stock in a continuous process after cutting from the block of cured foam. Polymer foam in the form of roll stock may then be used in subsequent processing, treating, or forming, for example as absorbent core material. In a preferred embodiment the web is processed and rolled into roll stock at a substantially constant linear speed, with any further processing, such as dewatering, occurring between being cut and being wound as roll stock.

FIG. 1 shows in perspective an embodiment of an apparatus of the present invention 10, and a block 1 of material, for example, a block of cured HIPE foam material, being cut into a web of uniform thickness by the method of the present invention. As shown in FIG. 1, block 1 is preferably in the shape of a right circular cylinder with a central axis 2, and a perimeter face 3. When block 1 is oriented such that central axis 2 is generally vertical, as shown in FIG. 1, perimeter face 3 is defined by the generally vertical side of cylinder-shaped block 1, extending substantially orthogonally between the generally circular lower base section 6 and the generally circular upper base section 8 of block 1. By "base section" is meant a generally flat surface generally orthogonal to the vertical side of a cylinder-shaped block. In the case of a circular cylinder, the base sections are preferably substantially perpendicular to the vertical sides, thereby being generally circular surfaces.

When block 1 is HIPE foam, it is preferably cut shortly after curing, while the block is still at or near the cure temperature. Suitable curing temperatures will vary depending upon the monomer and other makeup of the oil and water phases of the emulsion (especially the emulsifier systems used), and the type and amounts of polymerization initiators used. Frequently, however, suitable curing conditions will involve maintaining the HIPE at elevated temperatures above about 122° F. (50° C.), more preferably above about 150° F. (65° C.), and most preferably above about 175° F. (80° C.), for a time period ranging from about 2 to about 64 hours, more preferably from about 2 to about 48 hours. The block may be cut after curing at temperatures below the curing temperature, including room temperature. For certain HIPE foam formulations, cutting at temperatures below room temperature have been successful.

Figure 3:
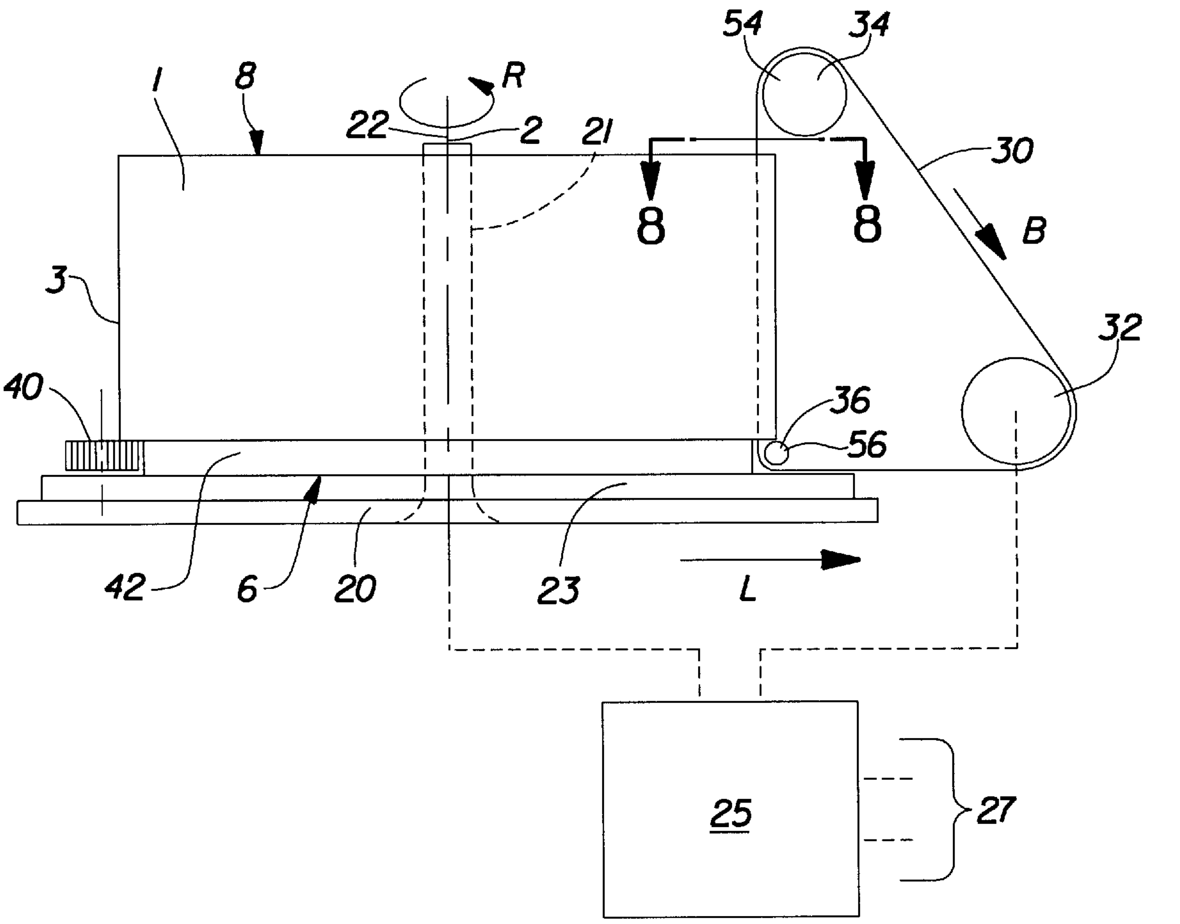
FIG. 3 is a side view of the apparatus shown in FIG. 1, showing a central controller.

As shown in FIGS. 1 and 3, block 1 rests upon generally lower base section 6 on a rotating platform, referred to as platen 20. Platen 20 is generally planar, preferably circular, and is rotatable about a generally vertical center axis orthogonal to the circular plane, shown in FIGS. 1 and 3 as platen axis 22. To minimize initial waste upon startup, block 1 is preferably positioned such that central axis 2 and platen axis 22 are generally coaxial prior to web cutting. If either central axis 2 of block 1 is offset from platen axis 22, or if block 1 does not initially have a circular cross section, non-continuous webs may be produced until both conditions are met. For this reason, when cut by the method of the present invention, the length of the continuous web produced is maximized by having a block of circular cross section and by properly aligning the central axis of the block with the platen axis prior to cutting.

In a preferred embodiment, block 1 does not rest directly upon platen 20, but is supported by a block support pallet 23, as shown in FIGS. 1 and 3. Block support pallet 23 may initially be part of the mold used to cure the polymer foam into a block. The sides and top (if used) of the mold may be removed, leaving the remaining portion as a support pallet for the cured block of foam. The pallet may be made of any suitable material able to provide adequate structural support, including wood, steel, and molded plastic.

Support pallet 23 aids in handling block 1 by providing for a rigid base support such that block 1 may be lifted, transported, and positioned for cutting. Additionally, support pallet may have means for alignment upon platen 20, thereby assuring proper alignment of the block prior to cutting. For example, support pallet 23 may have indentations, grooves, slots, etc., that mate with complimentary protrusion on platen 20 to assure accurate placement of the support pallet in relationship to the platen.

As shown in FIGS. 1 and 3, support pallet 23 preferably has a rigid central member 21 coaxial with generally vertical platen axis 22. Rigid central member 21 is preferably integrally connected to support pallet 23 and aids in stabilizing block 1 during the cutting operation. Rigid central member 21 may have various protuberances as required to aid in fixing block 1 in operable position during cutting, including aiding in driving the block rotation. Alternatively, block 1 may be fixed in position by a top clamp, the top clamp fixing block 1 in place relative to platen axis 22.

In a preferred embodiment, platen 20 is mounted on linear slide bearings 24, and coupled to a controlled linear drive mechanism 26. In a preferred embodiment, linear drive mechanism 26 comprises a ball-screw mechanism. However, it is contemplated that other linear slide or roller mechanisms are feasible, and that linear drive mechanism 26 may be any suitable drive, such as pneumatic, hydraulic, chain and sprocket, or any drive mechanism known in the art. As more fully described below, the combined rotation and linear movement of platen 20, and thereby block 1, provides for precise cutting of block 1 into sheets or webs 50 of substantially uniform thickness. While the preferred embodiment of the present invention is described with reference to platen 20 being linearly translated, it is to be noted that the same process could be performed by linearly translating a cutting blade into a rotating, but linearly stationary, platen.

Figure 2:
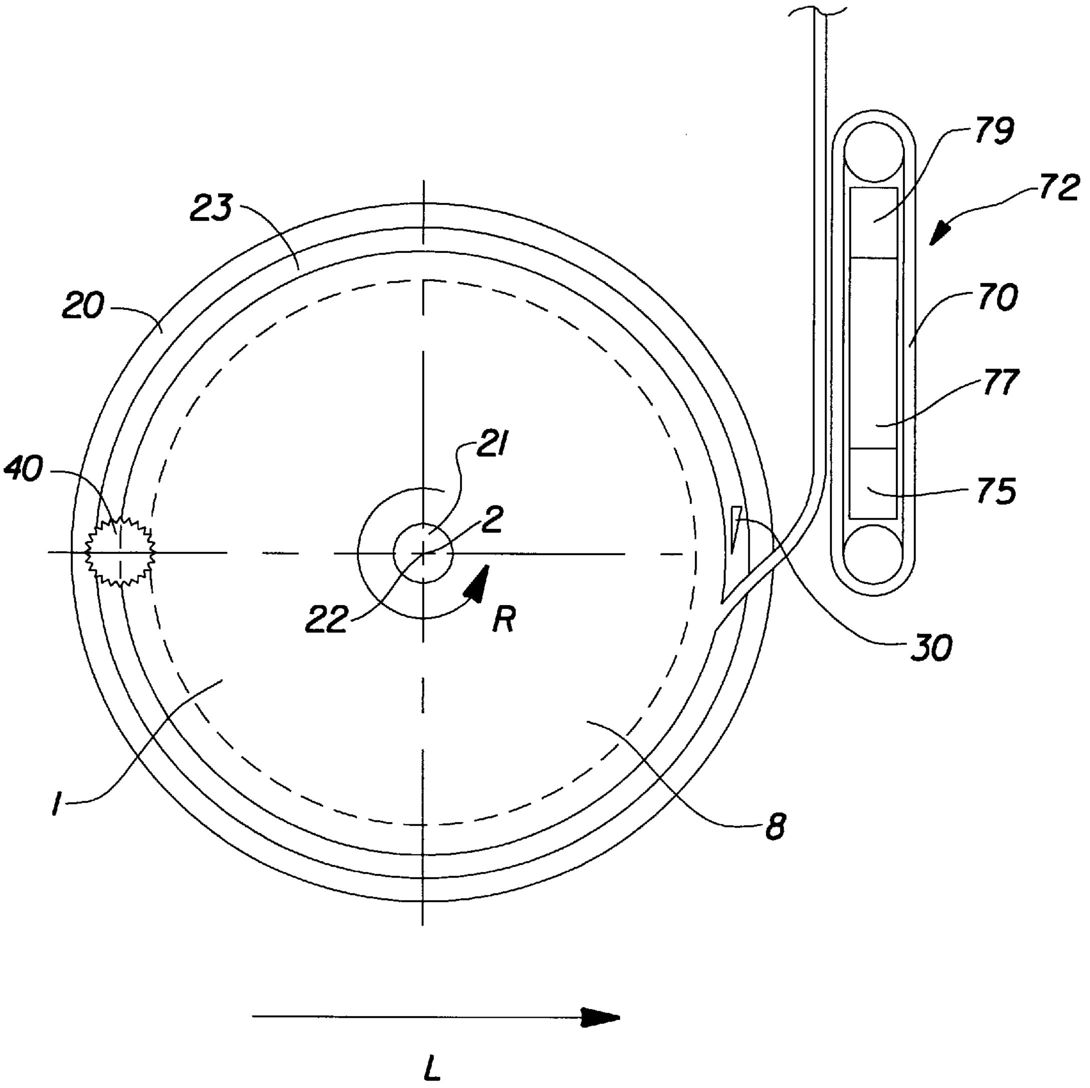
FIG. 2 is a plan view of the apparatus shown in FIG. 1.

As shown in FIGS. 1, 2, and 3, blade 30 is oriented generally vertically and substantially parallel to central axis 2. Once cutting is initiated, and any necessary rounding off of block 1 is accomplished, blade 30 remains generally parallel to perimeter face 3 during web production. While many different blade configurations may work, including toothed and un-toothed reciprocating blades, blade 30 is preferably a toothless continuous band as shown in FIGS. 1 and 3. If a continuous band is used, blade 30 is preferably mounted on at least three pulleys, as shown in FIG. 3. Drive pulley 32 preferably serves as a guide pulley as well, making continuous slight adjustments to blade position during the cutting operation.

In a band saw configuration, as shown in FIG. 3, the size and placement of pulleys 32 and 34 are not critical, and may be placed as appropriate by one skilled in the art. However, the size and placement of pulley 36 is critical, as shown in FIG. 3. Pulley 36 is preferably made as small as possible, thereby ensuring a maximum web width, as more fully described below. In operation pulley 36 is continually water washed to cool the bearing and to remove debris. The water wash also serves to provide some lubrication and cleaning to blade 30 which, surprisingly, cuts better when moving up through the block, that is, when the band travels clockwise with reference to FIG. 3, as shown by arrow B. Without being bound by theory, it is believed that cleaner cuts are obtained by running the blade up through the block because the water wash of pulley 36 is more effective in keeping pulley 36 free of cutting debris. Blade 30 is also kept cleaner as a result, thereby resulting in a smoother, cleaner cut. In a preferred embodiment, blade 30 runs at a linear speed of 110–160 feet/min, to produce a cut web moving at a linear speed of about 50 feet/min.

When a continuous band blade is used, as shown in FIG. 3, upper and lower idler pulleys 34 and 36 serve as upper and lower blade securements, 54 and 56, respectively. By "securement" is meant a physical restraint which serves to hold the blade in a generally vertical orientation and in a generally parallel relationship with generally central axis 2, and thereby parallel to perimeter face 3 during web production. Various blade types and configurations require differing types of securements. For example, as used in the present invention and shown in FIG. 14, a generally straight reciprocating blade 30 would require an upper securement 54 mechanically connected to a swing-arm follower 62 and cam 60 arrangement, and a lower securement 56 connected to lower securement support member 55. Reciprocating blade embodiments are more fully described below with reference to FIG. 14 and the accompanying text. However, high-speed production of continuous webs may also be accomplished by use of a preferred continuous blade design, also more fully described below.

As may be understood from FIGS. 1, 2, and 3, in operation platen 20 is preferably rotated about platen axis 22 while platen 20 is simultaneously moving linearly in the direction of blade 30 such that block 1 is fed into blade 30. For each rotation of platen 20, linear drive mechanism 26 linearly advances platen 20 a distance predetermined by the operator as the desired web width. Web thickness is controlled by the relationship of platen rotation and platen translation (linear movement), and is defined as the thickness of material between perimeter face 3 and blade 30 at the instant perimeter face 3 is cut away and becomes one side of web 50. As can be understood from FIG. 2, as perimeter face 3 is being removed by cutting, new perimeter face 3 is continuously exposed, with perimeter face 3 becoming continuously closer to central axis 2 during operation of apparatus 10.

To maintain a constant web thickness platen 20 is preferably linearly advanced continuously as it rotates, with a central controller 25, as shown in FIGS. 2 and 3, coordinating the platen movements and other saw operations. Although not presently preferred, it is to be appreciated that alternatively platen 20 may be rotated only, e.g., no linear movement, with blade 30 being linearly advanced into rotating platen 30. In either alternative, a critical parameter to control is the relative relationship between central axis 20 (and thereby perimeter face 3) and blade 30. The central controller 25 is preferably programmable, such that an operator may simply choose a predetermined desired web thickness and operating speed, the central controller 25 dictating all other processing parameters. As shown schematically in FIG. 4, the path of the blade as it cuts the web is essentially a spiral, beginning at the outside of the block and progressing inward. A constant tangential velocity in the outgoing (cut) web is maintained by cutting along the spiral path at a constant linear velocity.

Figure 4:
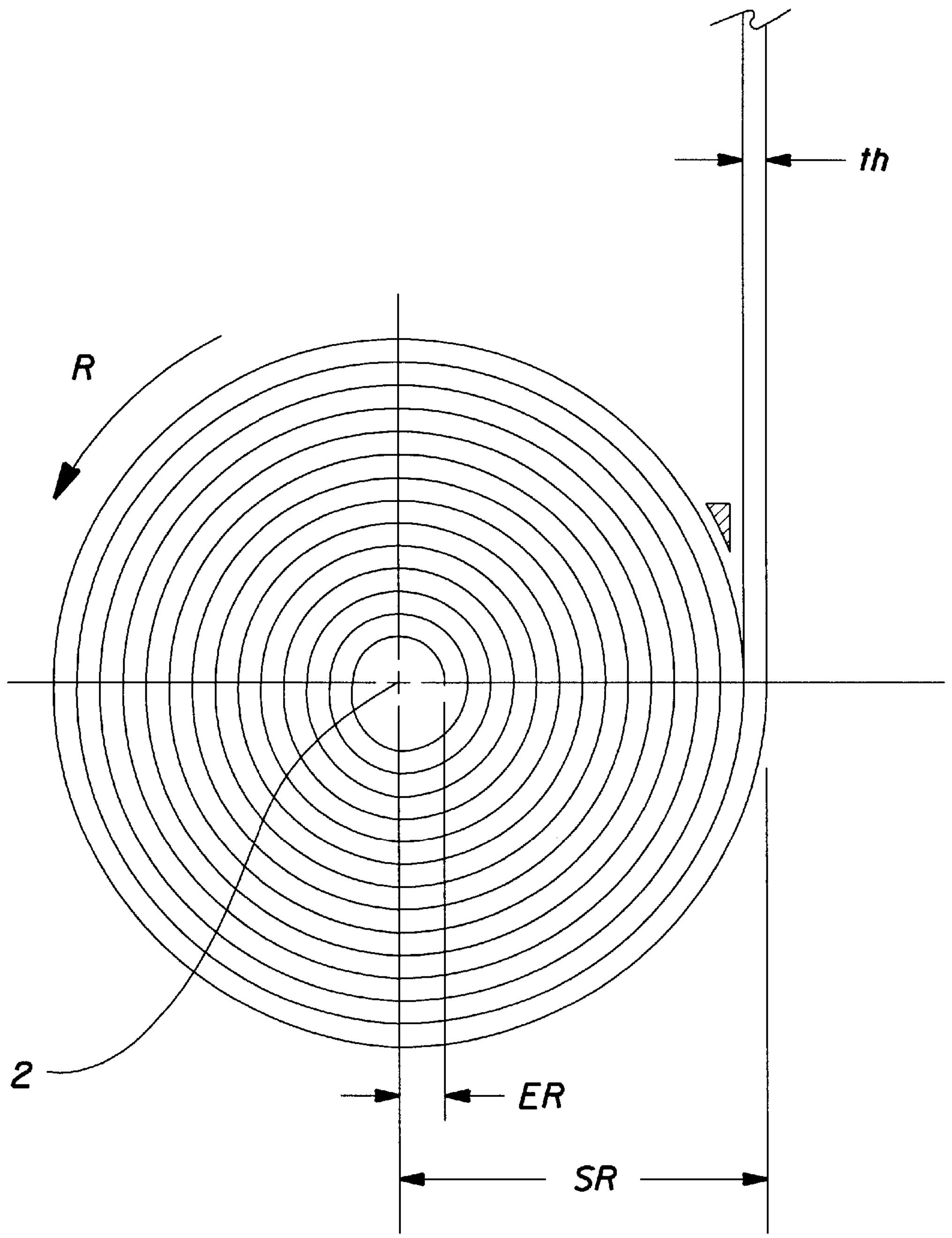
FIG. 4 is a schematic representation of the spiral cut path of the apparatus of the present invention.

Constant velocity along the spiral path is preferably accomplished by position loops simultaneously controlling two axes of motion, i.e., the rotational and linear motion of platen 20. The distance between the blade and the center of rotation of the block is controlled by the linear axis, while the rotational axis controls tangential motion, including the tangential velocity of the periphery of the block being cut. Control is preferably accomplished by first moving the platen 20 from a beginning distance between the center of rotation and the blade to the start radius SR. The start radius SR, shown in FIG. 4, is the maximum radius for a given cylindrical block. For a non-round block, the start radius would be the maximum distance between the central axis 2 and an outside edge or corner of the block. As noted above, however, continuous webs will not be produced until the block is "rounded off", thereby being generally circular in cross section.

The spiral cut continues from the start radius SR to the end radius ER. The end radius ER is typically as near the rigid central member 21 as is practicable to minimize waste. The rotational axis and platen positions are controlled such that block 1 is moved a "target" distance along the spiral path at a constant velocity. The "target" distance is a calculated distance along the spiral cut path that must be traversed in a given time interval in order for the tangential web velocity to remain constant throughout the cutting operation. In a preferred embodiment, the position targets are updated on a fixed time interval of 2 msec.

In a preferred embodiment, the target distance, TD, which is the distance to move along the spiral cut path within the fixed time increment, is defined by the equation:

$$TD(\text{in})=(\text{web line speed}(\text{ft/min})*12(\text{in/ft})/60\ \text{sec/min}))*\text{time interval}(\text{sec.})$$

The total target distance TD traversed along the spiral path is computed as an accumulated running total, ATD, and used in the following equations to determine the target positions of the rotating platen (angular axis), θ (radians), and the radius (linear axis), r (in), to the cutting blade:

$$r=\text{sqrt}(SR(\text{in})^2-A(\text{in})*ATD(\text{in}))$$

$$\theta=(SR(\text{in})-r(\text{in})/B(\text{in})$$

where the constants A and B are determined by the cut thickness (th) desired and are calculated by the equations:

$$A=th(\text{in})/\pi$$

$$B=th(\text{in})/2\pi$$

Therefore, as can be seen from the above equations, the controller takes the web line speed and cut thickness as inputs 27 from an operator, and then uses position loops to control two axes of motion to ensure a constant tangent velocity along a spiral path, and consequently a constant linear velocity in the cut web as it is conveyed away for further processing.

The speed of both the rotational axis and the axis controlling the cut radius (linear advancement of the platen) are constantly changing with time to ensure that the linear velocity of the cut web is maintained at the predetermined line speed. The change is due to the geometry of the spiral cut and requires that both angular velocity and linear advancement both increase non-linearly with decreasing block radius. Therefore, the rate of angular rotation and the rate of linear advancement are not linear as a function of cut distance, but both actually increase with cut distance such that the tangential velocity remains constant.

As noted above, because of the physical characteristics of typical water-filled polymeric foam blocks, such as weight and strength, block 1 should be supported directly by platen 20 upon its base at all times during the web cutting process. To produce a substantially uniform web thickness, blade 30 is preferably secured by both an upper securement 54 and a lower securement 56. However, this presents a design difficulty since lower securement 56 should remain above platen 20, but below block 1 as platen 20 continues to advance linearly. Even if not secured by a lower securement, there should be clearance below the block for the end of a blade to extend. This technical difficulty is solved by displacing a certain amount of block material, forming a displaced portion 65 of block 1 in the area of lower blade securement 56, such that lower blade securement 56 may operate above platen 20 and below block 1 in displaced portion 65.

In a preferred embodiment displaced portion 65 is formed by a groover 40 as shown in FIGS. 1, 2, and 3. In a preferred embodiment, a 24-tooth milling cutter approximately four inches in diameter is utilized as a groover, 40, as shown in FIGS. 1–3. Groover 40 continuously displaces by removal a predetermined amount of material from block 1 as it rotates, making a groove or notch in the block itself near lower base 6, thereby forming groove 42 between the block and the platen. Groove 42 forms the necessary displaced portion 65, and permits a lower securement, for example lower idler pulley 36, to operate in a space that may be as large as required.

Groover 40 is attached and driven by any suitable means (not shown). In a preferred embodiment, groover 40 is part of an assembly comprising a spring-loaded arm attachment means that urges groover 40 into block 1 near base 6. To adjust the amount of material removed by groover 40, i.e., the depth of groove 42, groover 40 is also preferably attached to at least one adjustable idler roller that gently rolls upon perimeter face 3 above displaced portion 65 as the block rotates upon platen 20. The spring-loaded arm attachment and idler roller ensure that the groover maintains a constant position in relation to block 1, such that a constant groove depth is maintained.

Groove 42 is preferably as small as is reasonably practicable. Both the height of groove 42 as well as the depth are preferably minimized. Unnecessary height of groove 42 limits the width of the finished web by removing material that could be used as finished web material. If the depth of groove 42 becomes excessive, the cantilevered portion of the block above the groove may become too great, leading to possible structural damage or failure due to fracture. This is especially true when the block being cut is a block of water-filled HIPE foam. Because the HIPE foam must generally remain fully supported, there is a limit the depth of groove 40 may reach before the cantilevered effect leads to the failure of the cantilevered portion. For blocks having a height of approximately 24 inches, i.e., blocks from which a web having a 24 inch width could be cut, a groove depth of less than one inch is preferred.

In a continuous blade, i.e., a band saw, embodiment lower idler pulley 36 serves as lower securement 56 and is preferably sized so as to maximize the width of material in the finished web. As shown in FIG. 3, in relation to pulleys 32 and 34, idler pulley 36 is much smaller, being sized such that it may operate at least partially within groove 42. Groove 42 remains at a constant depth as the radius of block 1 decreases and platen 20 is moved linearly toward blade 30, so that pulley 36 remains at least partially within, and in substantially constant spatial relationship to, groove 40 during the cutting operation.

Depending on the particular material used for blade 30, at very small pulley diameters blade life may become unacceptably short, therefore design tradeoffs exist between blade life and idler pulley size. As noted above, an increase in idler pulley size makes a larger groove necessary, decreasing the amount of block available to be cut into a web. Therefore, there is a correlative design tradeoff between blade life and web width, at least for a given block height. An acceptable compromise between web width and blade life may be achieved by the use of an approximately one inch diameter lower idler pulley 36. In particular, a preferred idler pulley is comprised of Kel-F CTFE, available from McMaster-Carr, with a Duralon bushing, such as Rex Duralon bearings from Rexnord Corporation, Downers Grove Ill. In a preferred embodiment the pulley and bearing are supported on a hardened stainless steel shaft with water lubrication. The water lubrication keeps the bearing shaft surface clean and helps cool the bearing during high-speed cutting.

Figure 5:
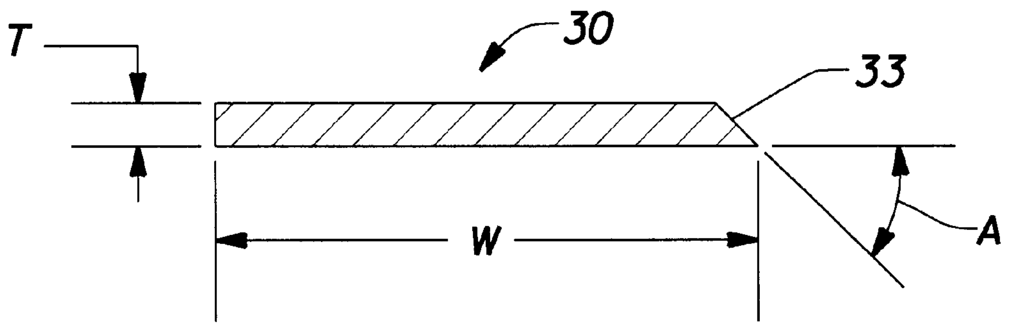
FIG. 5 is a cross-sectional view of a blade element of the present invention.
Figure 6:
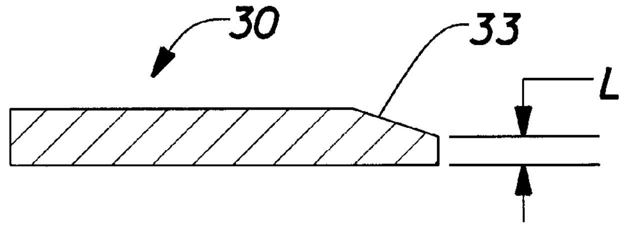
FIG. 6 is a cross-sectional view of an alternative embodiment of a blade of the present invention.
Figure 7:
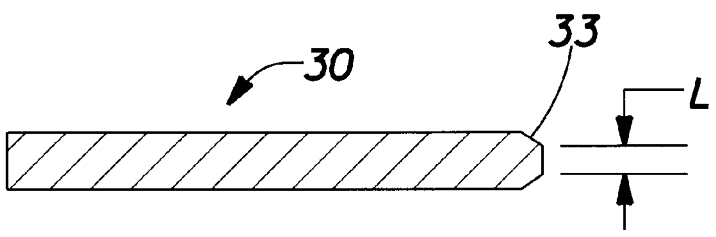
FIG. 7 is a cross-sectional view of a further alternative embodiment of a blade of the present invention.

Blade life is also determined by blade design. For cutting HIPE foam blocks with either a reciprocating "saber" saw blade, or a continuous blade embodiment, a stainless steel knife-edge blade 30, i.e., a blade having no teeth, performs satisfactorily, and is preferred over a toothed blade. As shown in FIG. 5, blade 30 for use with a continuous band saw configuration preferably has a width, W, of about one inch, a thickness, T, of approximately 0.005 inches, and a single-bevel leading edge 33, cut at an angle, A, of 15° to 45°. A suitable blade for use with a reciprocating saw configuration has similar dimensions, but with a thickness of about 0.027 inches. Blade life may be lengthened by cutting the leading edge 33 of the blade with a blunted angle as shown in FIGS. 6 or 7. In either the configuration of FIG. 6 or FIG. 7, the leading edge 33 of the blade is blunted to form a land area L. Blades with land area L perform longer, producing a higher quality cut, than blades with no land area, as shown in FIG. 5. Without wishing to be bound by theory, it is believed that blades with land area L perform longer due to corrosive and wear effects on the leading edge. A sharpened leading edge, as shown in FIG. 5 tends to corrode and wear in a non-uniform manner producing a "jagged" edge that does not produce an acceptably high quality cut in the finished web.

To aid in producing webs having uniform thickness, a blade guide 67 is preferably used to guide and stiffen blade 30. Blade guide 67 is designed to aid in tracking the blade vertically, such that the cut web thickness is constant across the width of the web. It should have adequate stiffness and fit closely enough about the blade so as to enable the blade to withstand the lateral and edge-on forces of the block as it is being fed into the blade, and keep the blade from deflecting, "drifting", or "wandering" off of the cut path.

However, care must be taken to ensure that the blade guide does not crimp or bind up the blade, thereby hindering or preventing the blade from functioning in its intended motion.

Figure 8:
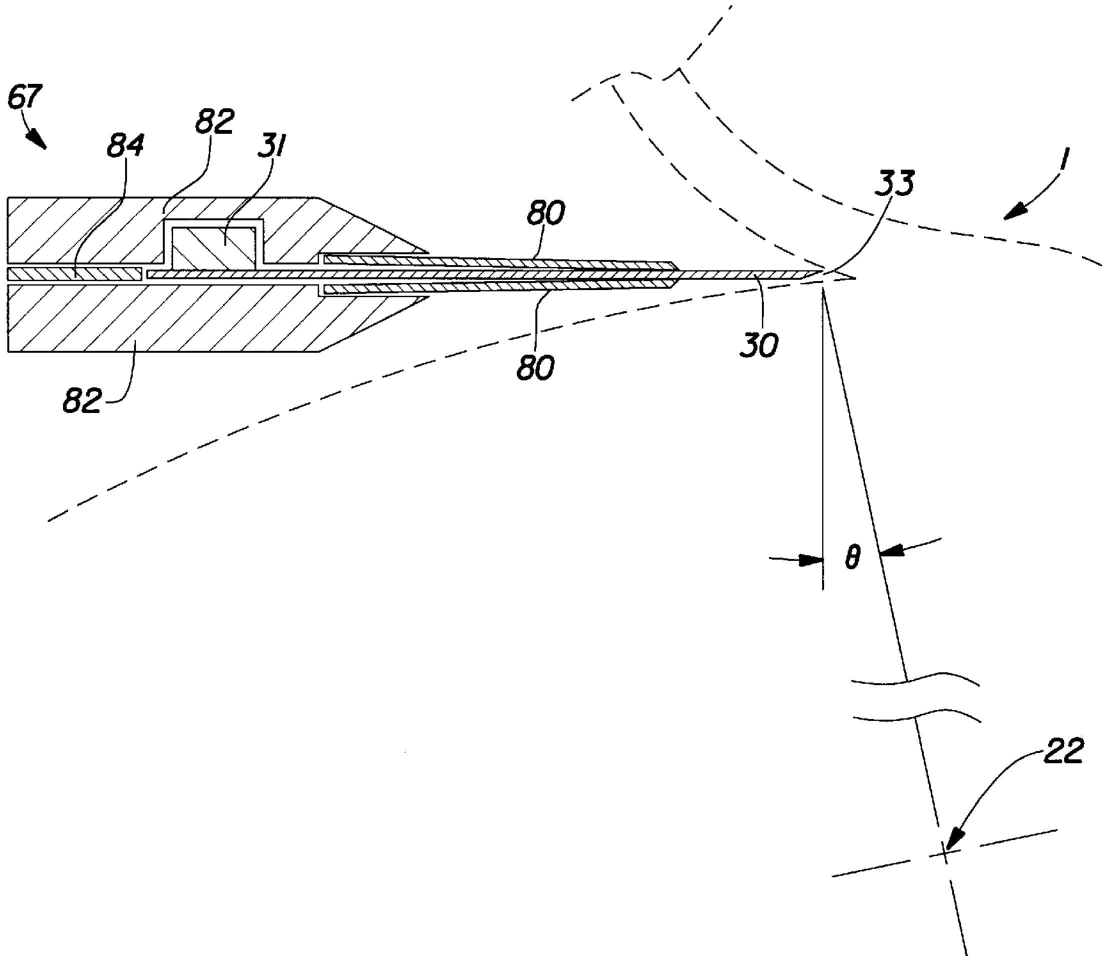
FIG. 8 is a cross-sectional view of a blade and blade guide assembly of the present invention taken along section line 8—8 of FIG. 3.

A preferred blade guide for a continuous band saw configuration is shown in FIG. 8, which shows a blade guide and blade in cross section, representing cross section 8—8 of FIG. 3. In the embodiment shown, blade guide 67 includes two guide members 80 made of thin, relatively stiff sheet material, for example, tempered spring steel. The guide members are preferably stainless steel thin enough so as not to interfere with the web as it is cut by the leading edge 33 of blade 30. A preferred thickness for guide member 80 is 0.025–0.030 inches, with a most preferred thickness 0.027 inches. Guide members 80 are attached by connection means (not shown) to guide member supports 82, which are attached to, and spaced apart by, blade guide spacer 84. Riveting with countersunk and ground rivets is the currently preferred method of connecting guide members 80 to guide member supports 82. One or both of guide member supports 82 may be grooved to provide a space for flexible bead 31 to track, described below with reference to FIGS. 11–13.

Figure 9:
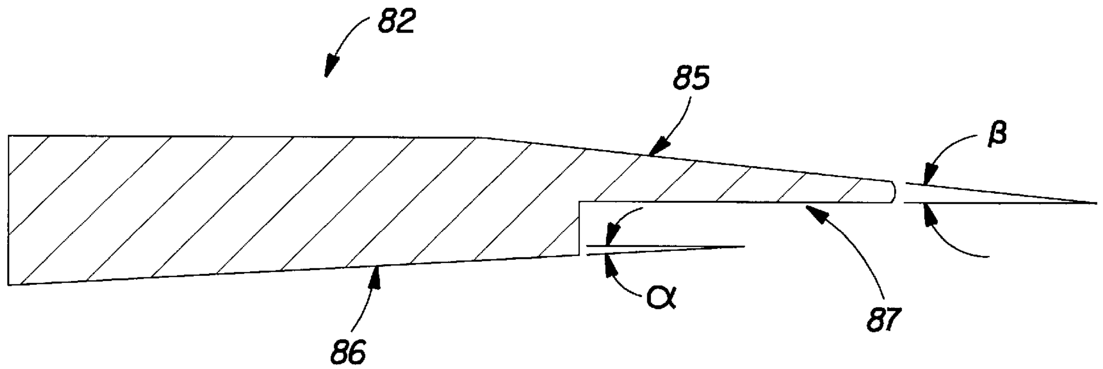
FIG. 9 is a cross-sectional view of an element of a blade guide of the present invention.

Guide members 80 are preferably mounted at a slight angle in relation to blade 30 such that they make minimal contact with blade 30. The minimal contact should occur as near leading edge 33 of the blade as practicable. A preferred method for accomplishing minimal contact with blade 30 is to mount guide members 80 to specially made guide member supports 82 as shown in FIG. 9. As shown in FIG. 9, blade-facing surface 86 is not parallel with guide member mounting surface 87, but is actually formed at an angle $\alpha$. In operation blade-facing surface 86 is generally parallel to blade 30 so that mounting surface 87, and therefore mounted guide members 80 make an acute angle with blade 30. It has been found that an angle $\alpha$ of about 1° is preferred to assure that guide members 80 (not shown in FIG. 9) approach blade 30 at an angle, nearly touching near leading edge 33. Additionally, to assure that the cut web does not interfere with the blade guide 67, guide member support 86 is formed with a leading taper. For example, in FIG. 9 surface 85 is formed at an angle $\beta$ to surface 87. It has been found that an angle $\beta$ of about 5° is preferred to assure that blade guide 67 does not interfere with the cut web as it is removed from the block.

In addition to the overall profile of the blade guide should be designed so as to minimize the effective increase in blade/blade guide width and thickness. In particular, minimizing the blade guide thickness aids in cutting by allowing the block and the blade to operate in relation to one another at nearly right angles. For example, in FIG. 8 block 1 is represented as a broken line. Because of the design of blade guide 67, block 1 is not advanced linearly at a right angle to blade 30. Instead, block 1 is advanced at some angle $\theta$ that allows the curvature of the block to clear the blade guide. It has been found that for a cylindrical block diameter of up to approximately 54 inches, the radius of curvature of the circumference of the block requires that the angle $\theta$ of linear advancement into blade 30 be approximately 6°, as depicted schematically in FIG. 8. As the web is cut, and the block diameter decreases, this angle may be decreased, but it is not necessary to do so. Greater or lesser angles may be used as necessary, depending on the blade guide configuration, the blade width and thickness, and the overall diameter of the starting block.

Figure 10:
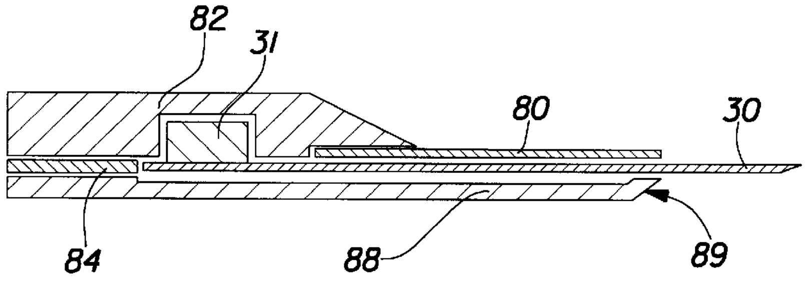
FIG. 10 is a cross-sectional view of an alternative blade and blade guide assembly of the present invention.

One preferred blade guide variation for use with a continuous blade to minimize possible interference of blade guide 67 with block 1 during cutting is shown in cross section in FIG. 10. The blade guide configuration shown in FIG. 10 minimizes the thickness of the blade guide on the block side of the blade by use of a low profile blade guide 88. Low profile guide 88 replaces both the guide member and guide member support on the block side of the guide. As shown in FIG. 10, low profile guide member 88 is preferably formed with a lip 89 so as to minimize contact with blade 30. Low profile guide member 88 is preferably made of similar material to guide member support 82, such as stainless steel.

To further aid in blade guiding and tracking in continuous blade configurations, various blade design modifications may be made. One option, shown in FIGS. 8 and 10 with reference to the preferred blade guides, is to mold a flexible bead 31 of suitable polymeric material to the blade 30. The polymeric material chosen should have sufficient flexibility and durability so as to last as long as the blade. A preferred polymer for this purpose is polyurethane, preferably with 30–60 Shore A durometer. Pulleys, for example pulleys 32, 34, and 36 in FIG. 3, may have grooves formed (not shown) to accept flexible bead 31, thereby serving as guides and urging blade 30 to track correspondingly. Blade 30 is kept from "walking" off of pulleys, or otherwise drifting on the pulleys by firmly seating flexible bead 31 into grooves on each pulley.

Figure 11:
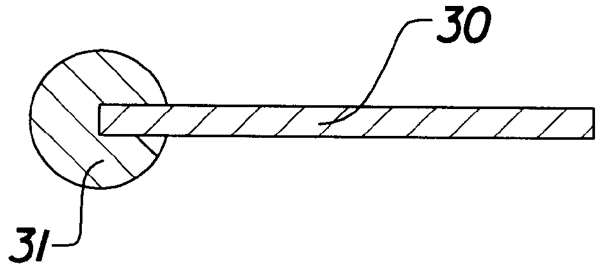
FIG. 11 is a cross-sectional view of a blade design incorporating a flexible bead attached to the trailing edge.
Figure 12:
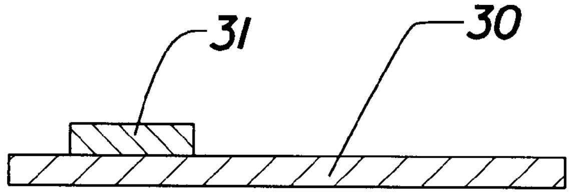
FIG. 12 is a cross-sectional view of a blade design incorporating a flexible bead attached to one side of the blade.
Figure 13:
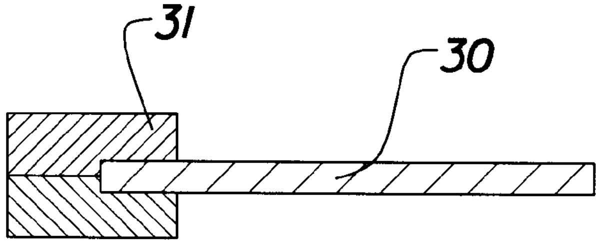
FIG. 13 is a cross-sectional view of a blade design incorporating another embodiment of a flexible bead attached to the trailing edge of the blade.

The flexible bead 31 may be formed in many different shapes and configurations, and those shown in FIGS. 11–13 are meant to be illustrative but not limiting. The bead may be molded and/or adhered to the blade in any manner known in the art for forming or adhering polymers on metal. In one embodiment, a bead as shown in FIG. 11 may be molded onto the trailing edge of blade 30. In such a configuration, bead 31 preferably has a bead diameter of 0.060–0.090 inches designed to run in corresponding grooves in the pulleys. In a more preferred embodiment, as shown in FIG. 12, flexible bead 31 is essentially a polymer belt bonded to the pulley-side of blade 30, that likewise runs in corresponding grooves in the pulleys. In the general configuration shown in FIG. 12 the bead preferably has a total thickness (elevation off the blade) of about 0.030 inches. In still another alternative, two belts of polymeric material could be affixed together on the trailing edge of blade 30, as shown in FIG. 13. In all cases, corresponding grooves in pulleys and blade guides would assure proper tracking of the blade.

Figure 14:
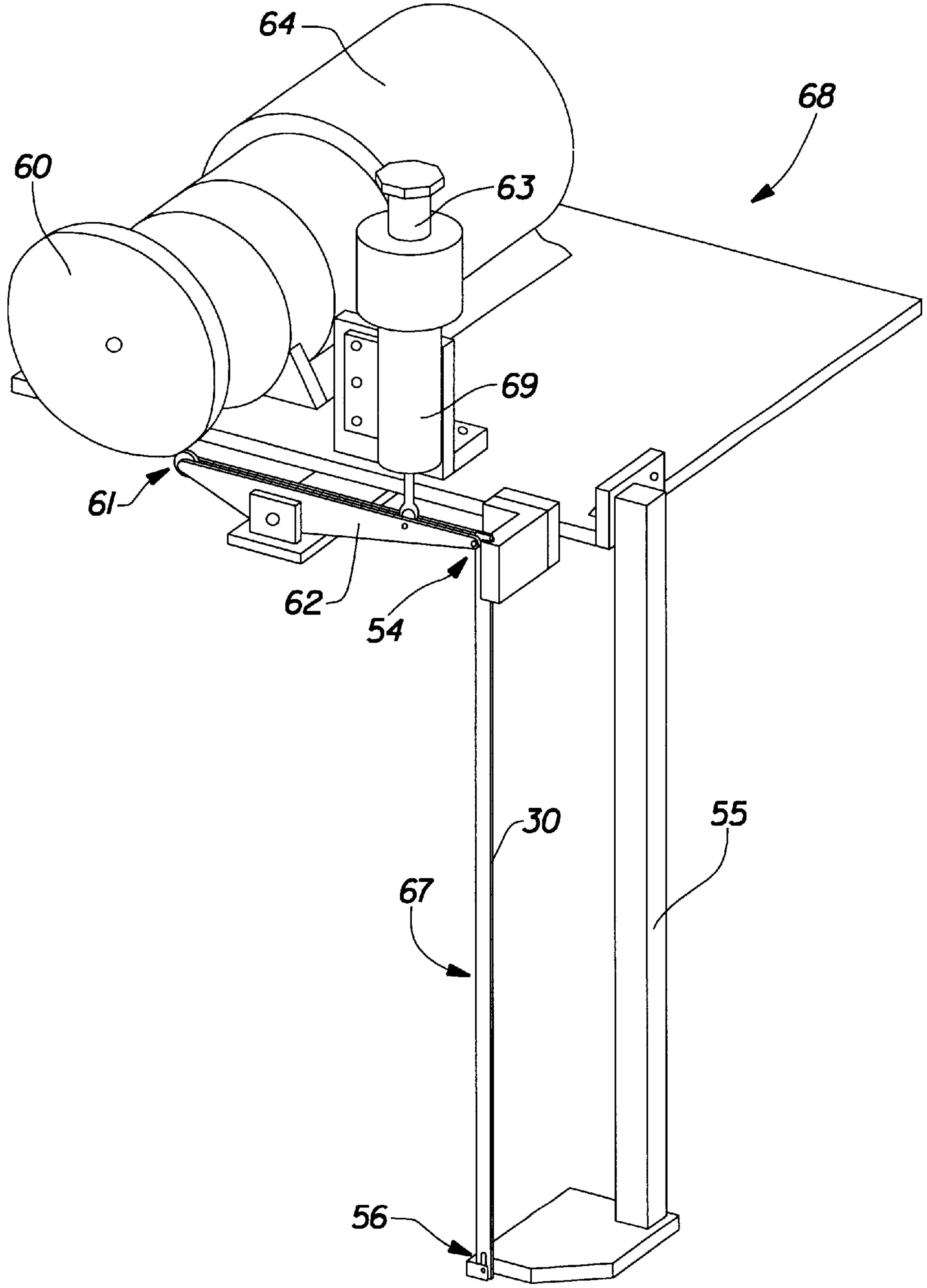
FIG. 14 is a perspective view of a reciprocating saw embodiment of the present invention.

An alternative embodiment of the present invention comprises a reciprocating saw arrangement 68, the major components of which are depicted in FIG. 14. As shown, a preferred reciprocating saw arrangement 68 preferably comprises a motor 64 that drives a cam 60. The motor may be linked to a suitable gear box to provide the desired cam RPM output. In a preferred embodiment motor 64 and associated gearing allows for variable RPM outputs. Cam 60 in turn drives a cam follower that actuates lever arm 62, which is mechanically linked to produce the reciprocating motion of blade 30. As shown, in a preferred embodiment a spring-loaded bias is applied to lever arm 62 to ensure proper continuous rolling contact of cam follower 61 upon cam 60. Adjusting screw 63 may be included to adjust the necessary spring force upon lever arm 62, depending upon the RPM of the motor and cam.

In the reciprocating saw arrangement shown in FIG. 14, blade 30 is held by a pin and hole, or pin and slot arrangement for the upper securement 54. Blade 30 is slotted at its lower end to form a pin and slot lower securement 56. Blade guide 67 may be used to stiffen and help guide blade 30, the blade guide supported similarly at the upper and lower securements. However, the increased thickness of a preferred reciprocating blade decreases the need for a relatively complex blade guide as described above with reference to FIGS. 8–10. Suitable designs for a reciprocating blade guide include standard guides such as those manufactured by Bosch, Inc., for their line of reciprocating saws.

Figure 15:
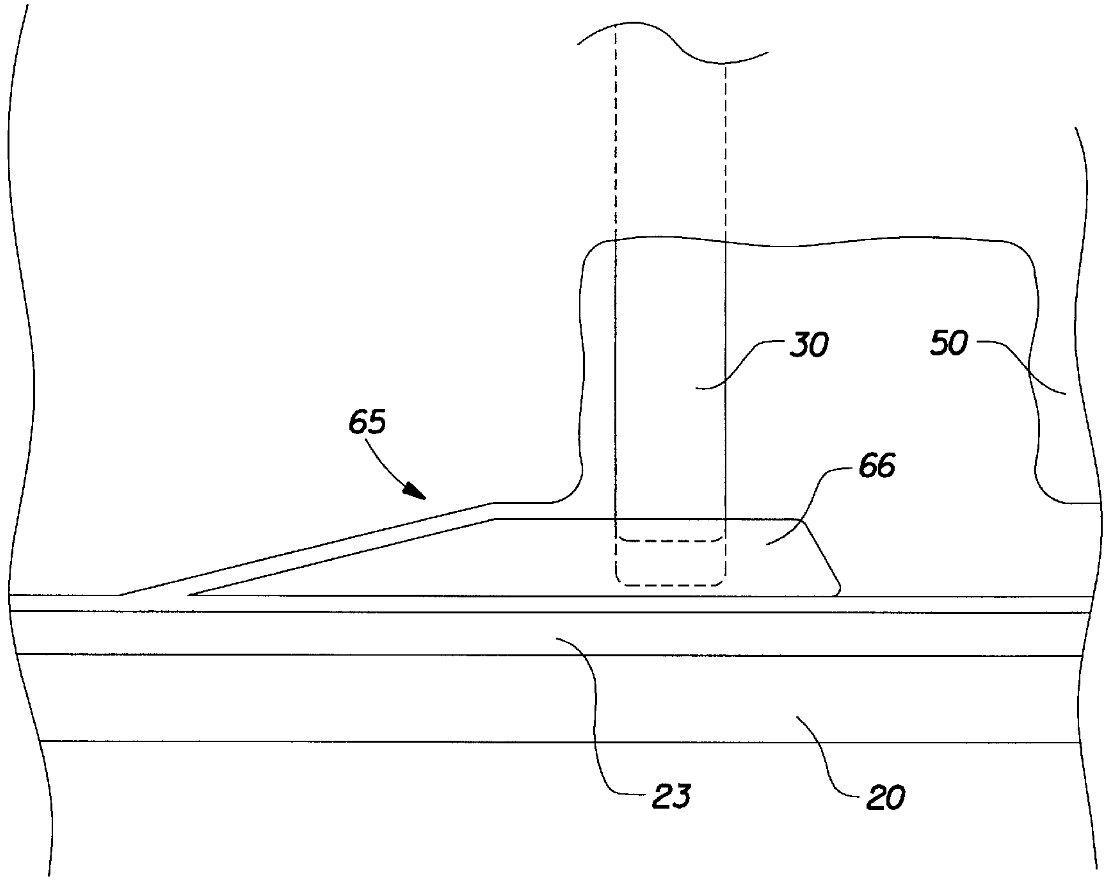
FIG. 15 is a partial cut-away view of a displacing shoe in operation.

When the reciprocating saw arrangement depicted in FIG. 14 is used, groover 40 is preferably used to form a groove to accommodate lower securement 56. However, and alternative method of forming a displaced portion 65 is to use a displacing shoe 66 attached to lower securement 56. As shown in a partially cut-away form in FIG. 15, displacing shoe 66 acts as a wedge to lift the portion of the block to be cut prior to and during the cutting operation. Displacing shoe 66 is designed to allow the lower end of the blade 30 to move up and down in the displaced portion, and forms part of lower securement 56 (not shown in FIG. 15). When a displacing shoe is used, it is not necessary to form groove 42, by use of a groover or any other method.

After the web is cut from the block, it is drawn away for further processing by a vacuum take away unit 72, as shown in FIGS. 1 and 2. A preferred vacuum take away unit 72 comprises an air permeable endless belt 70, that wraps around a vacuum box and is driven such that the linear velocity of the belt is constant and substantially equal to the tangential velocity of the perimeter face of the block, and thereby substantially equal to the linear velocity to the web once it is cut. The vacuum causes suction that draws the web sufficiently tightly against endless belt 70 such that belt 70 is essentially a vertical conveyor carrying the web off of the block as it is formed.

Vacuum take away unit 72 preferably comprises three sections, each section having independently adjustable vacuum levels. After being cut by the blade, the web is drawn away from the blade by a first vacuum section 75, as shown in FIG. 2. First vacuum section 75 has a level of vacuum sufficient to draw the web away from the blade without causing undue crimping, bending, or tearing of the web as it is cut. Ideally, the proximity of vacuum take away unit 72 and vacuum level of first vacuum section 75 allows the system to be "self threading". In other words, once blade 30 begins cutting a continuous web, the leading edge is attracted to and positively controlled by first vacuum section 75, then the web is conveyed on for further processing in a continuous fashion.

Second vacuum section 77 has a level of vacuum sufficient to pull the foam web linearly at a velocity substantially equal to the tangential rotational velocity of the rotating block. Section 77 is primarily a conveying section, that is, its primary purpose is to pull the web in the web direction at a constant velocity.

The web that is cut from a water-filled HIPE foam block is itself water-filled, so vacuum section 79 has sufficient vacuum to dewater the web to a certain degree, preferably about 50%. Vacuum section 79 has a primary purpose of removing a substantial amount of water and is the first in a series of dewatering steps used in a preferred web forming apparatus. If desired or necessary, further dewatering and washing/dewatering steps may be utilized to produce a web having desired physical properties.

The web may then be conveyed for further processing as needed. For example, in the case of HIPE foams, the web may be de-watered as necessary, rolled on to rolls as rollstock, or compressed to a different thickness. Additional de-watering vacuum shoes may be used, as well as various drying methods known in the art, such as radiant heat drying.

While particular embodiments of the present invention have been illustrated and described, it would be obvious to those skilled in the art that various other changes and modification can be made without departing from the spirit and scope of the present invention. The foregoing is therefore intended to cover in the appended claims all such changes and modifications that are within the scope of the present invention.

What is claimed is:

1. An apparatus for forming a continuous web of a foam material from a water-filled block of a foam material, said water-filled block of a foam material having a base and a central axis extending generally orthogonally from said base, said apparatus comprising:

(a) a rotatable platen oriented such that said water-filled block of a foam material can be rotatably supported upon its base on said platen;

(b) a displacing means for displacing portions of said water-filled block of a foam material adjacent said rotatable platen, wherein a displaced portion of said water-filled block of a foam material is formed near its base, said displaced portion being defined by the portions of said water-filled block of a foam material remaining immediately adjacent said displaced portion of said water-filled block of a foam material;

(c) a blade positioned generally vertically and substantially parallel to said central axis of said water-filled block of a foam material, said blade positioned to cut into said water-filled block of a foam material a predetermined distance from said central axis by making a vertical motion substantially parallel to said central axis, said blade having a portion operatively disposed within said displaced portion;

(d) upper blade securement and a lower blade securement, said upper blade securement positioned above said water-filled block of a foam material, and said lower blade securement at least partially operatively disposed within said displaced portion to constrain said blade parallel to said central axis of said water-filled block of a foam material;

(e) a rotational means for rotating said platen;

(f) an advancement means for linearly decreasing said predetermined distance of said blade from said central axis; and (g) a controller for controlling said blade and said platen in operative relationship such that the continuous web of a foam material is produced as rotating platen is rotated while said predetermined distance of said blade from said central axis is continuously decreased.

2. The apparatus of claim 1, wherein said water-filled block of a foam material is generally cylindrically shaped such that said base has a generally circular cross section.

3. The apparatus of claim 1, wherein said advancement means linearly advances said rotatable platen.

4. The apparatus of claim 1, wherein said displacing means comprises a milling cutter such that a continuous groove is formed.

5. The apparatus of claim 1, wherein said blade comprises a continuous band saw blade.

6. The apparatus of claim 1, wherein said blade comprises a toothless continuous band saw blade.

7. The apparatus of claim 1, wherein said blade includes an attached polymer bead.

8. The apparatus of claim 1 further comprising a blade guide disposed between said upper and lower securements, such that said blade guide supports and guides said blade.

* * * * *